US009591174B2

(12) United States Patent
Miyazawa

(10) Patent No.: US 9,591,174 B2
(45) Date of Patent: Mar. 7, 2017

(54) IMAGE READING APPARATUS HAVING COMMUNICATION INTERFACE FOR TRANSMITTING SCANNED DATA TO SERVER

(71) Applicant: BROTHER KOGYO KABUSHIKI KAISHA, Nagoya-shi, Aichi-ken (JP)

(72) Inventor: Masafumi Miyazawa, Nagoya (JP)

(73) Assignee: BROTHER KOGYO KABUSHIKI KAISHA, Nagoya-shi, Aichi-ken (JP)

(*) Notice: Subject to any disclaimer, the term of this patent is extended or adjusted under 35 U.S.C. 154(b) by 0 days.

(21) Appl. No.: 14/867,719

(22) Filed: Sep. 28, 2015

(65) Prior Publication Data

US 2016/0094754 A1 Mar. 31, 2016

(30) Foreign Application Priority Data

Sep. 30, 2014 (JP) .................. 2014-201154

(51) Int. Cl.
H04N 1/32 (2006.01)
H04N 1/00 (2006.01)

(52) U.S. Cl.
CPC ..... *H04N 1/32475* (2013.01); *H04N 1/00228* (2013.01); *H04N 1/00241* (2013.01); *H04N 1/00244* (2013.01); *H04N 1/00482* (2013.01); *H04N 1/32037* (2013.01); *H04N 1/32374* (2013.01); *H04N 1/32534* (2013.01); *H04N 2201/0094* (2013.01)

(58) Field of Classification Search
CPC ................................ H04N 1/32475
USPC ............................... 358/1.13, 1.15
See application file for complete search history.

(56) References Cited

U.S. PATENT DOCUMENTS

| 2012/0113453 A1* | 5/2012 | Ito .......... H04N 1/00244 358/1.13 |
| 2012/0113464 A1 | 5/2012 | Inoue et al. |
| 2014/0123295 A1* | 5/2014 | Kuykendall .......... G06F 21/577 726/25 |
| 2014/0160504 A1* | 6/2014 | Nakashima ........ H04N 1/00408 358/1.13 |

FOREIGN PATENT DOCUMENTS

| JP | 2005-269250 A | 9/2005 |
| JP | 2012-099011 A | 5/2012 |

* cited by examiner

*Primary Examiner* — Jacky X Zheng
(74) *Attorney, Agent, or Firm* — Merchant & Gould P.C.

(57) ABSTRACT

An image reading apparatus is configured to: control a scanner unit to optically scans a document and generate scanned data; provide an input screen for allowing a user to input format information defining a particular file format of transmission data that contains the scanned data, wherein the format information includes additional information and wherein the input screen includes a first field for inputting item name of the additional information to be included in the transmission data and a second field for inputting a value of the additional information corresponding to the item name of the additional information; receive the format information input by the user; generate the transmission data, wherein the generated transmission data contains the scanned data and has the format according to the format information received in the receiving processing; and transmit the transmission data to the server through the communication interface.

14 Claims, 9 Drawing Sheets

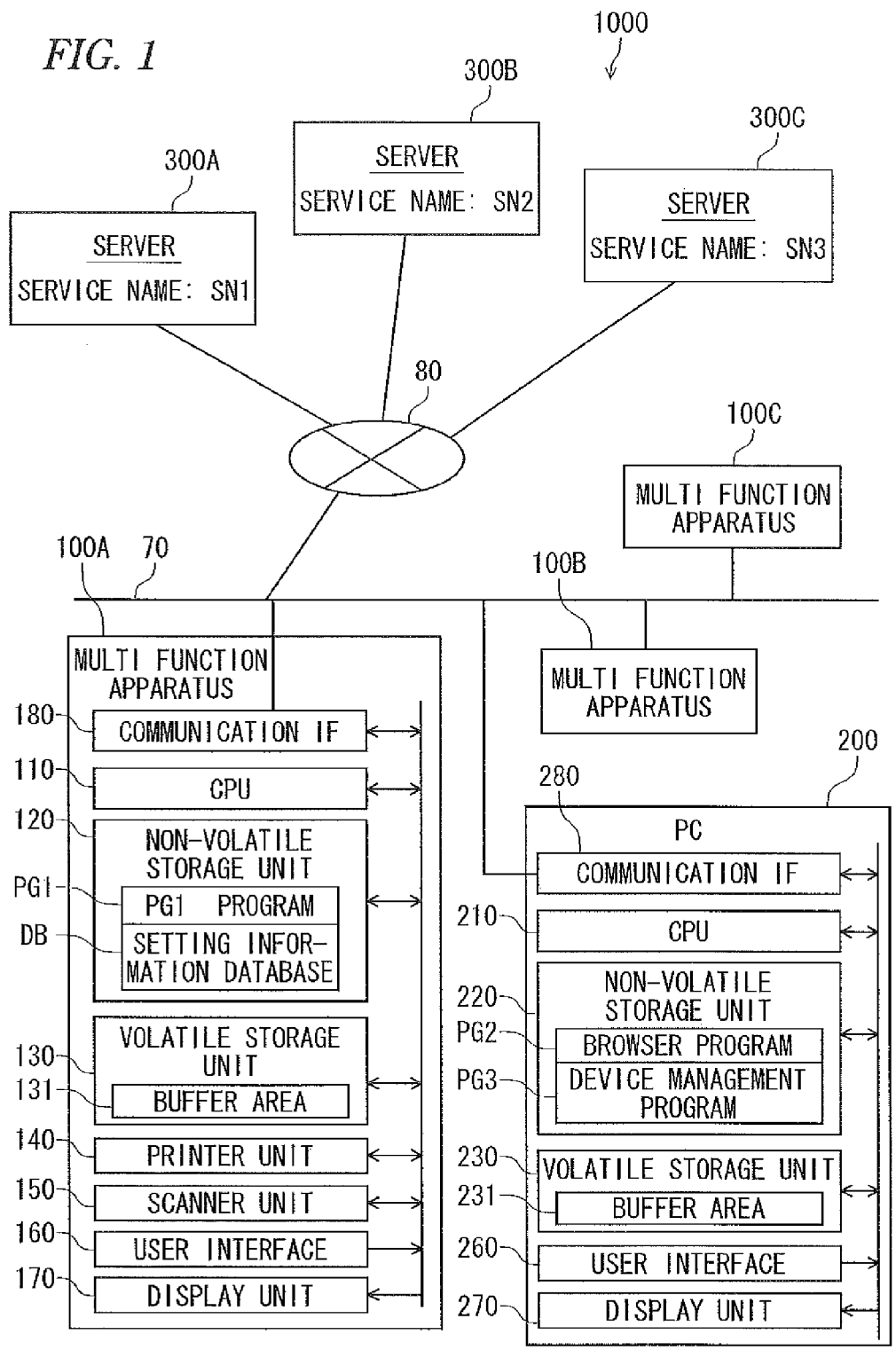

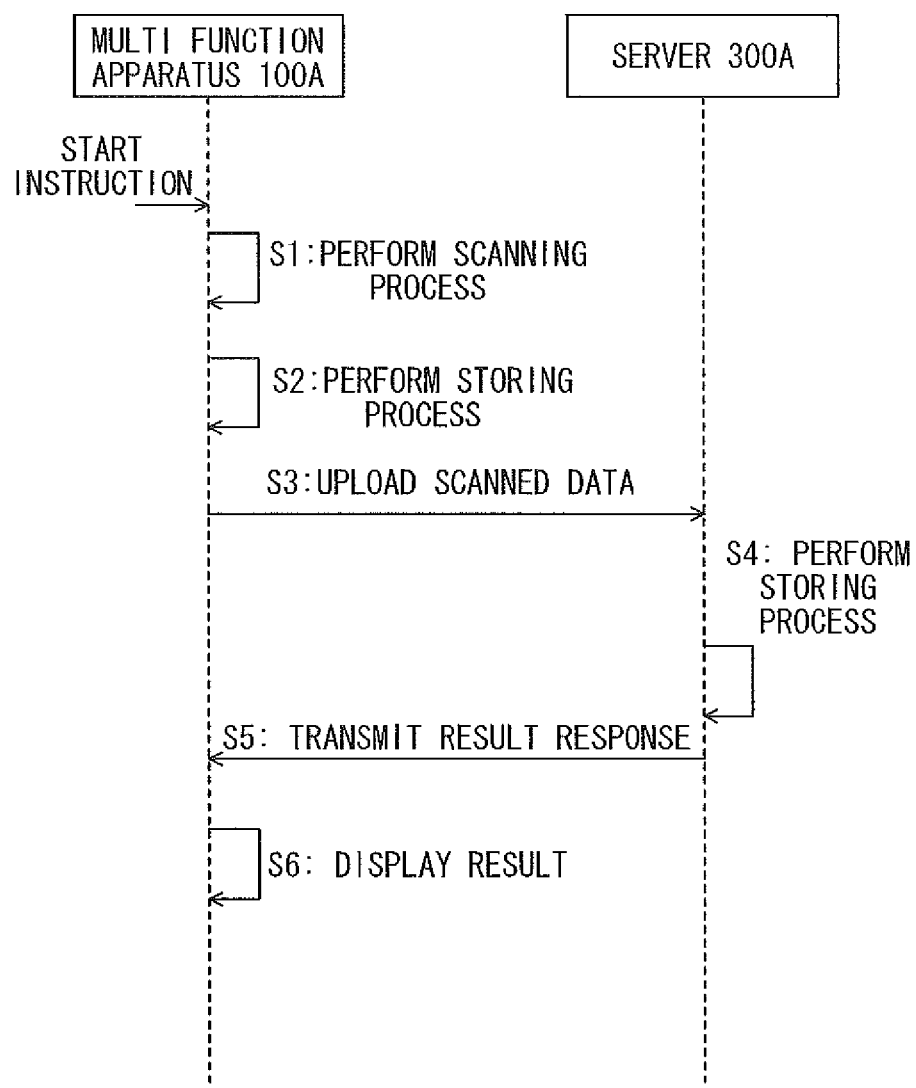

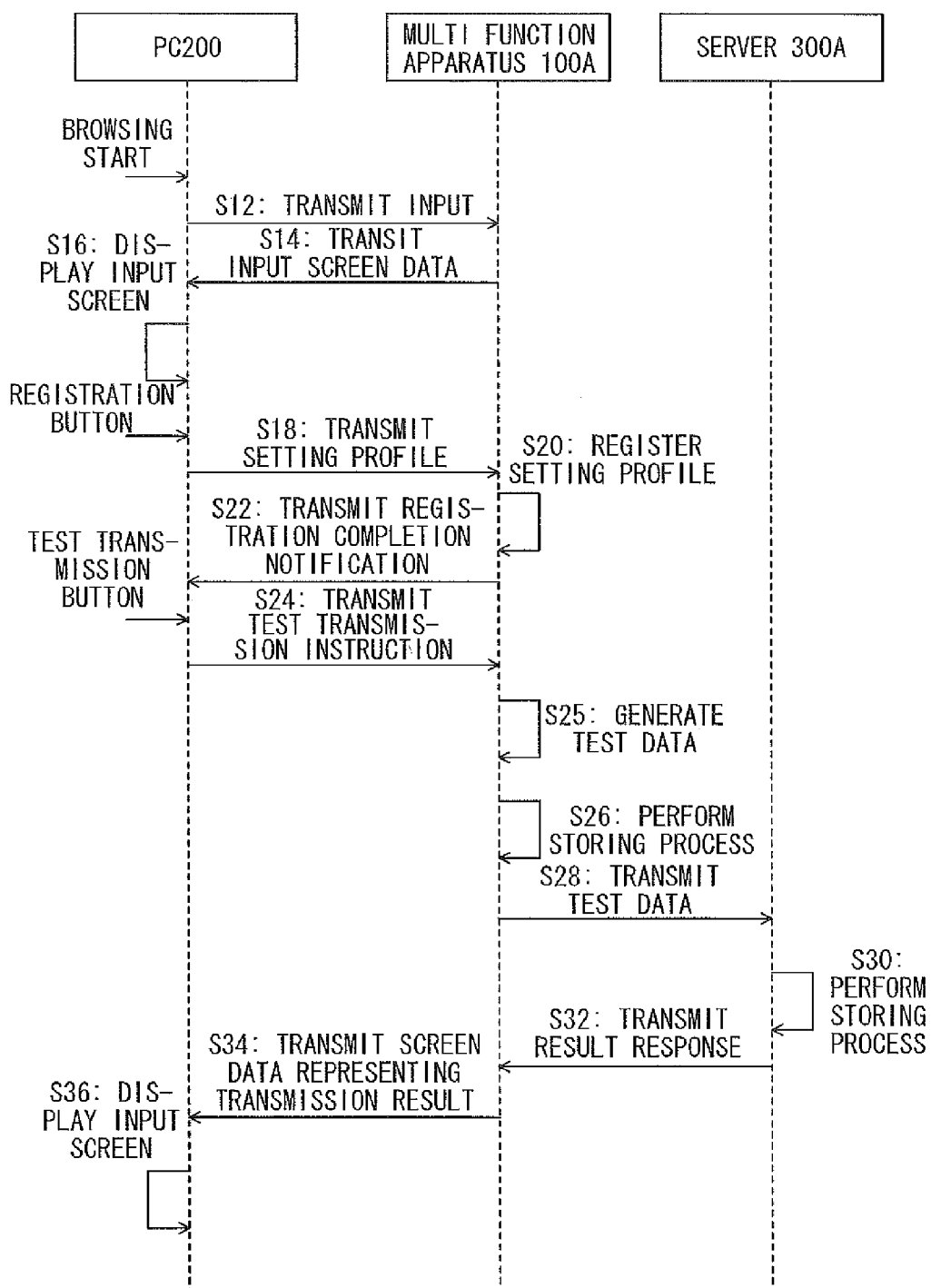

FIG. 4

```
Scan to HTTP
PROFILE NAME  [SN1]                                  —F1
─────────────────────────────────────────────────
         URL     [http:www.server1.com/image/]      —F2
         METHOD  [POST]                              —F3
                      F4              F5
                 ITEM NAME        VALUE
         HEADER  [X-UPLOAD-FILENAME] [_USER_TIME_.pdf]
                 [              ]  [              ]
                 [              ]  [              ] —F6
         BODY    ┌──────────────────────────────┐
                 │ type=pdf                     │
                 │ tag=invoice                  │
                 │ data=_File-DATA_:base64      │
                 │                              │
                 └──────────────────────────────┘

AUTHENTICATION
INFORMATION
    USER NAME  [_USER_:base64]                       —F7
    PASSWORD   [_PASS_:base64]                       —F8
─────────────────────────────────────────────────
SCANNING OPTIONS
    IMAGE QUALITY  [COLOR 200 dpi ▽]   —M1
    FILE FORMAT    [PDF           ▽]   —M2
    DOCUMENT SIZE  [LETTER        ▽]   —M3
    FILE SIZE      [MEDIUM        ▽]   —M4
─────────────────────────────────────────────────
 [ READ ]  [CANCELLATION] [REGISTRATION] [TEST TRANSMISSION]
   BT1         BT2            BT3              BT4
```

A1 → (upper section)
A2 → (scanning options section)
WP1 (window)

FIG. 5A
HTTP REQUEST

```
POST/image/HTTP/1.1
HOST:www.server1.com
User-Agent:DocumentScanner-001
X-UPLOAD-FILENAME:Alice201406301150.pdf
Authorization:Basic QWxpY2U6QWxpY2VzYW5ub3ub3
Connection:keep-Alive
Expect:100-continue
Content-Length:345456 type=pdf
tag=invoice
data=if78yh8wq9pdfh76a···········
·····························
f0984epj48
```

FIG. 5B
HTTP RESPONSE (TRANSMISSION RESULT RESPONSE)

```
HTTP/1.0 200 OK
Content-Type:application/json

{
"result" : "sucess"
}
```

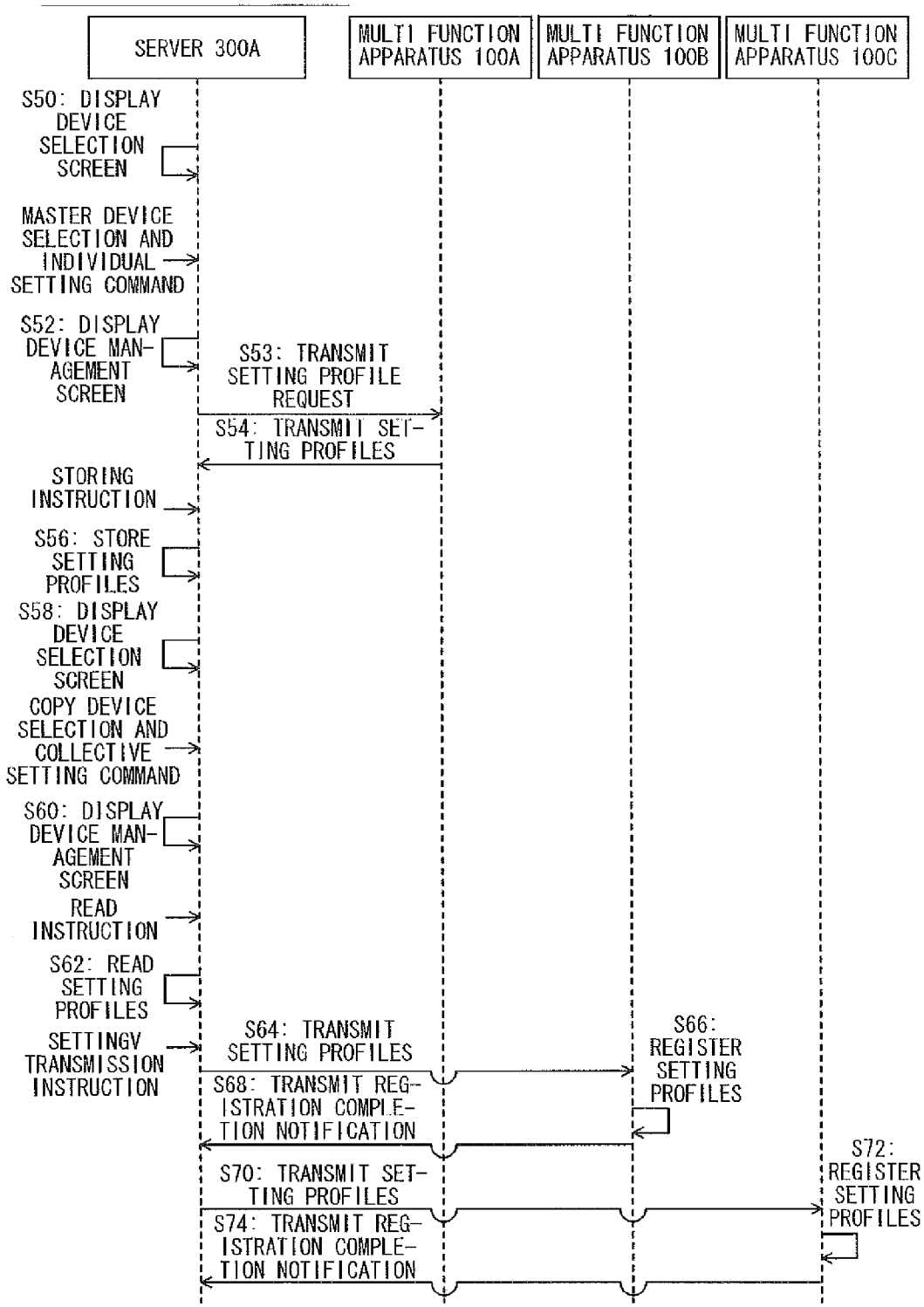

IMAGE READING APPARATUS HAVING COMMUNICATION INTERFACE FOR TRANSMITTING SCANNED DATA TO SERVER

CROSS-REFERENCE TO RELATED APPLICATION

This application claims priorities from Japanese Patent Application No. 2014-201154 filed on Sep. 30, 2014, the entire subject matters of which is incorporated herein by reference.

TECHNICAL FIELD

The present disclosure relates to a configuration for enabling an image reading apparatus to perform communication with a service providing server through a network.

BACKGROUND

In order to transmit scanned data to servers through a network, an image reading apparatus contains the scanned data in transmission data (for example, HTTP requests). In this case, the formats of the transmission data may differ depending on the servers. For this reason, in order to transmit scanned data to servers, an image reading apparatus has transmission programs corresponding to transmission data formats for the servers. There has been disclosed a communication system which includes a relay apparatus for relaying scanned data transmission in order to transmit scanned data from an image reading apparatus to service providing servers through a network. In this communication system, the relay apparatus executes a transmission program prepared for each server, thereby relaying transmission of scanned data.

However, in the above described configuration, a transmission program for each server may be required. For this reason, an apparatus for storing the corresponding transmission program and executing the corresponding transmission program may be required.

SUMMARY

The present disclosure has been made in view of the above circumstances, and one of objects of the present disclosure is to provide a configuration enabling an image reading apparatus to store scanned data in transmission data having an appropriate format and transmit the transmission data to each server, without using a transmission program which is prepared for the corresponding server.

According to an illustrative embodiment of the present disclosure, there is provided an image reading apparatus including: a scanner unit configured to optically scans a document; a communication interface configured to be connectable with a network and establishes communication with a server that provides a service through the network; a processor; and memory storing computer readable instructions that, when executed by the processor, causing the image reading apparatus to perform: image reading processing of controlling the scanner unit to optically scans a document and generating scanned data; input screen providing processing of providing an input screen for allowing a user to input format information defining a particular file format of transmission data that contains the scanned data, wherein the format information includes additional information and wherein the input screen includes a first field for inputting item name of the additional information to be included in the transmission data and a second field for inputting a value of the additional information corresponding to the item name of the additional information; receiving processing of receiving the format information with the item name and the value of the additional information input by the user through the input screen; data generating processing of generating the transmission data, wherein the generated transmission data contains the scanned data and has the particular file format according to the format information received in the receiving processing; and data transmitting processing of transmitting the transmission data generated in the data generating processing to the server through the communication interface.

According to another illustrative embodiment of the present disclosure, there is provided a non-transitory computer readable recording medium storing computer readable instructions for a terminal device that is provided with a communication interface, and a processor, wherein the instructions, when executed by the processor, causing the terminal device to perform: input screen providing processing of providing an input screen for allowing a user to input format information defining a format of transmission data, wherein the input screen includes a plurality of fields, the plurality of fields including field for inputting item name of additional information to be included in the transmission data and field for inputting a value of the additional information corresponding to the item name of the additional information, the transmission data containing a scanned data generated by an image reading apparatus and is transmitted to a server to store the scanned data in the server from the image reading apparatus; and transmitting processing of transmitting the format information input by the user through the input screen to the image reading apparatus through the communication interface.

BRIEF DESCRIPTION OF THE DRAWINGS

In the accompanying drawings:

FIG. 1 is a block diagram illustrating a configuration of a system 1000 according to an embodiment of the present disclosure;

FIG. 2 is a flow chart illustrating a Scan-to-HTTP process;

FIG. 3 is a flow chart illustrating a Scan-to-HTTP setting process;

FIG. 4 is a view illustrating an example of an input screen WP1 of a first embodiment;

FIGS. 5A and 5B are views illustrating an HTTP request RQ and an HTTP response RS, respectively;

FIG. 7 is a flow chart illustrating a collective setting process;

DETAILED DESCRIPTION

Figure 6:
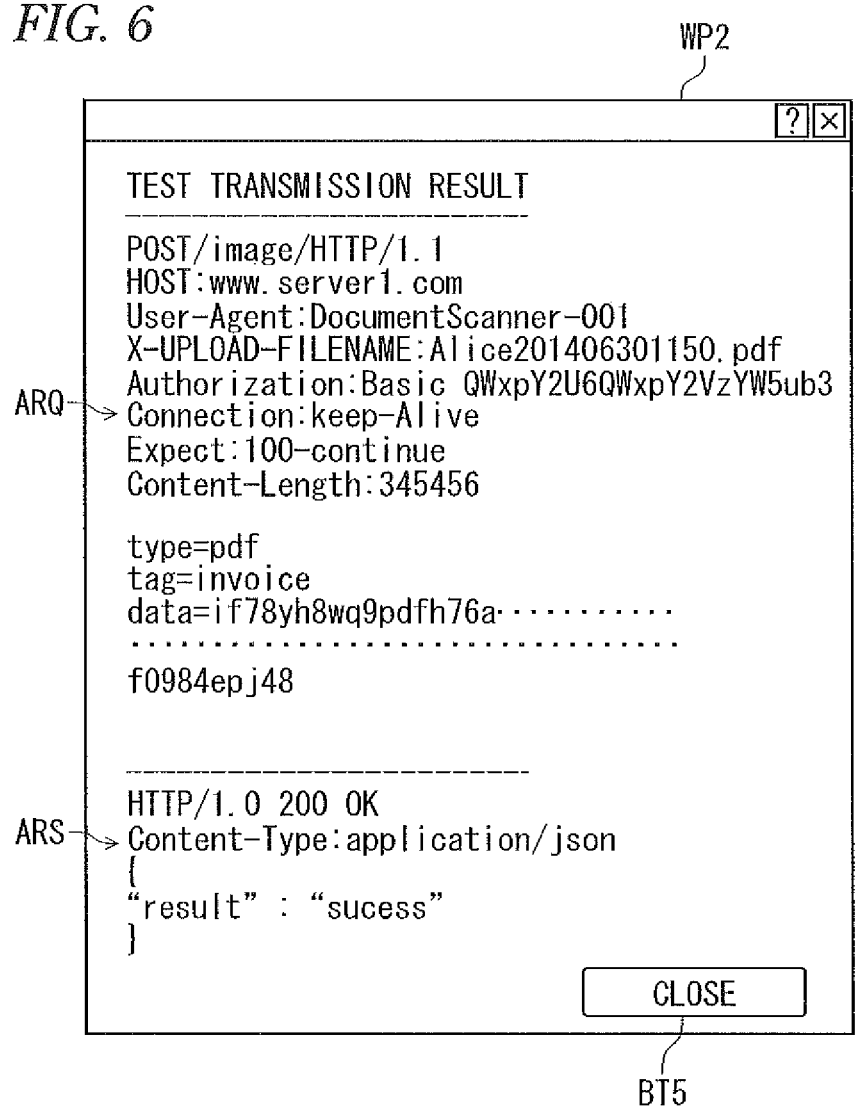
FIG. 6 is a view illustrating a notification screen WP2.

A mode of a configuration according to the present disclosure will be described based on an embodiment. FIG. 1 is a block diagram illustrating a configuration of a system 1000 according to the embodiment. The system 1000 includes a plurality of multi function apparatuses 100A to 100C, a personal computer (PC) 200, and a plurality of servers 300A to 300C. The plurality of multi function apparatuses 100A to 100C and the personal computer 200 are connected to one local area network (LAN) 70, and are used, for example, by members of one group of a company or the like. The LAN 70 is connected to the Internet 80. The servers 300A to 300C are connected to the Internet 80. The multi function apparatuses 100A to 100C and the personal computer 200 perform communication with one another through the LAN 70. Also, the multi function apparatuses 100A to 100C and the personal computer 200 perform communication with the servers 300A to 300C through the LAN 70 and the Internet 80.

The servers 300A to 300C provide WEB services capable of storing image data, to clients (for example, the personal computer 200 and the multi function apparatuses 100A to 100C) through the Internet 80. That is, the clients can access those servers by use of HTTP (an abbreviation for Hyper-Text Transfer Protocol), thereby receiving WEB service provision. Each server is, for example, a cloud server which includes a plurality of computers connected to one another such that communication is possible, and a plurality of storage units. Examples of WEB services include a storage service to store data received from clients, a social networking service to perform storing and disclosing of data received from clients, and an interpreting service to interpret image data received from clients and extract information from images.

The WEB services which are provided by the servers 300A, 300B, and 300C are named "SN1", "SN2", and "SN3", respectively. Providers of the WEB services "SN1", "SN2", and "SN3" which are provided by the servers 300A to 300C are different from one another. The providers of the WEB services "SN1", "SN2", and "SN3" are also different from the vendors of the multi function apparatuses 100A to 100C. In order to use the WEB services "SN1", "SN2", and "SN3", it is required to access different URLs (URL is an abbreviation for Uniform Resource Locator). It can be said that these URLs are location information items representing the locations of the servers 300A to 300C, which provide the WEB services "SN1", "SN2", and "SN3", on the Internet 80, respectively.

The multi function apparatus 100A which is example of an image reading apparatus in the embodiment includes a CPU 110, a non-volatile storage unit 120 such as a hard disk or an EEPROM, a volatile storage unit 130 such as a RAM, a printer unit 140 for printing images in a predetermined system (such as a laser system or an inkjet system), a scanner unit 150 for optically reading documents, thereby acquiring scanned data, an user interface 160 such as a touch panel and buttons, a display unit 170 such as a liquid crystal panel superimposed on the touch panel, and a communication interface (IF) 180.

The communication IF 180 is, for example, an interface based on Ethernet standards, and is used for connection with the LAN 70.

The non-volatile storage unit 120 stores a computer program PG1, and a setting information database DB storing setting information related to the multi function apparatus 100A. The volatile storage unit 130 is used as a buffer area 131 for temporarily storing a variety of intermediate data which are generated when the CPU 110 performs processing.

The computer program PG1 is stored in advance in the non-volatile storage unit 120 during shipment of the multi function apparatus 100A. Alternatively, the computer program PG1 may be downloaded from a server connected to the multi function apparatus 100A through the Internet 80, or may be installed from a CD-ROM, a DVD-ROM, or the like.

The CPU 110 executes the computer program PG1, thereby serving as a controller of the multi function apparatus 100A. Specifically, the CPU 110 controls the printer unit 140 or the scanner unit 150, thereby performing printing or scanning. Also, the CPU 110 provides user interface screens (also referred to as UI screens) for accessing the setting information database DB, to a terminal device (for example, the personal computer 200) of a user. The UI screens include, for example, an input screen for inputting the setting information stored in the setting information database DB. These UI screens are provided in a WEB page form to the terminal device. That is, the terminal device of the user can display those UI screens on the terminal device by accessing the multi function apparatus 100A by use of a WEB browser. In this case, the user performs inputting or reading of a variety of setting information through the UI screens which are displayed on the terminal device. Also, the CPU 110 performs a collective setting process (to be described below) in cooperation with the user's terminal device which acts a device manager (to be described below).

The configurations of the multi function apparatuses 100B and 100C are the same as the configuration of the multi function apparatus 100A described above.

The personal computer 200 (FIG. 1) is a computer of the user of the multi function apparatuses 100A to 100C, and is used as a terminal device which manages the multi function apparatuses 100A to 100C. The personal computer 200 includes a CPU 210 serving as a controller of the personal computer 200, a non-volatile storage unit 220 such as a hard disk drive, a volatile storage unit 230 such as a RAM, an user interface 260 such as a mouse and a keyboard, a display unit 270 such as a liquid crystal display, and a communication IF 280 for connection with the Internet 80.

The non-volatile storage unit 220 stores a browser program PG2 and a device management program PG3. The volatile storage unit 230 is used as a buffer area 231 for temporarily storing a variety of intermediate data which are generated when the CPU 210 performs processing.

The CPU 210 executes the browser program PG2, thereby serving as a WEB browser. The CPU 210 serving as a WEB browser can access the multi function apparatuses 100A to 100C, thereby receiving provision of UI screens having a WEB page form. That is, the CPU 210 serving as a WEB browser can display the UI screens such as input screens for inputting setting information to the multi function apparatuses 100A to 100C, based on the display unit 270.

Also, the CPU 210 executes the device management program PG3, thereby serving as a device manager. The device manager has a function of managing the multi function apparatuses 100A to 100C. The CPU 210 serving as the device manager can access each of the multi function apparatuses 100A to 100C by use of a predetermined protocol, for example, SNMP (an abbreviation for Simple Network Management Protocol), and acquire or change setting information stored in the setting information database DB. The CPU 210 serving as the device manager can display a UI screen on the display unit 270. This UI screen is different from the above described UI screens which are provided in the WEB page form.

Now, an overview of a Scan-to-HTTP process will be described. The Scan-to-HTTP process is a process of optically reading a document by a multi function apparatus, thereby generating scanned data, and transmitting (uploading) the corresponding scanned data from the multi function apparatus to a server which provides a WEB service. For transmission of scanned data, HTTP (an abbreviation for HyperText Transfer Protocol) is used.

FIG. 2 is a flow chart illustrating the Scan-to-HTTP process. When the user sets a document on the scanner unit 150 and then inputs a Scan-to-HTTP process start instruction to the multi function apparatus 100A, the Scan-to-HTTP process starts. The Scan-to-HTTP process start instruction includes designation of one setting profile of one or more setting profiles registered by a Scan-to-HTTP setting process (to be described below). Also, setting profile designation is performed by the user. An embodiment where a case of transmitting scanned data from the multi function apparatus 100A to the server 300A according to a setting profile will be described as an example.

In STEP S1, the CPU 110 of the multi function apparatus 100A performs a scanning process. Specifically, first, the CPU 110 controls the scanner unit 150, such that the scanner unit 150 optically scans the document according to pre-set scanning options, thereby generating scanned data representing the document. The CPU 110 stores the generated scanned data in a file format (for example, PDF (an abbreviation for Portable Document Format) or JPEG (an abbreviation for Joint Photographic Experts Group)) set in the scanning options. Scanning option information such as information representing the file format is included in the setting profile designated by the user.

In STEP S2, the CPU 110 performs a storing process of storing the scanned data (a scan file) generated in STEP S1, in transmission data (specifically, an HTTP request) having a format according to pre-set format information. By the storing process, an HTTP request including the scanned data and the format according to the format information is generated. The format information is included in the setting profile designated by the user.

In STEP S3, the CPU 110 uploads the scanned data to the server 300A. That is, the CPU 110 transmits the generated HTTP request including the scanned data, to the server 300A.

When the server 300A receives the HTTP request including the scanned data, in STEP S4, a CPU of the server 300A performs a storing process. Specifically, the CPU of the server 300A performs an authentication process using authentication information (for example, a password) included in the corresponding HTTP request. If the authentication is successful, the CPU stores the scanned data included in the corresponding HTTP request in a storage unit included in the server 300A.

In STEP S5, the CPU of the server 300A transmits a response (that is, a HTTP response) representing the transmission result of the scanned data, to the multi function apparatus 100A. For example, in a case where the scanned data is received by the server 300A without problems and is stored in a storage unit of the server 300A without problems, the transmission result response includes information representing success of uploading of the scanned data. Meanwhile, for example, in a case where the scanned data is not received by the server 300A or is not stored in a storage unit of the server 3 due to an error, the transmission result response includes information representing failure of uploading of the scanned data.

When the multi function apparatus 100A receives the transmission result response, in STEP S6, the CPU 110 of the multi function apparatus 100A displays the result of transmission (uploading) of the scanned data on the display unit 170, and finishes the Scan-to-HTTP process. Specifically, a notification screen similar to a notification screen WP2 (FIG. 6) for notifying information representing the result of transmission of test data (to be described below) is displayed on the display unit 170. That is, in the notification screen which is displayed in STEP S6, information (character strings) included in the HTTP request RQ transmitted to the server 300A in STEP S3 is shown as it is, and in the notification screen which is displayed in STEP 6, information (character strings) included in the HTTP response RS received with respect to the HTTP request including the scanned data from the server 300A in STEP S5 is shown as it is (see FIG. 6).

Although the case of uploading the scanned data to the server 300A has been described as an example, according to other setting profiles, it is possible to similarly upload scanned data to another server 300B or 300C.

Now, a Scan-to-HTTP setting process of configuring the setting information (also referred to as Scan-to-HTTP setting information) related to the Scan-to-HTTP process, in other words, a Scan-to-HTTP setting process of generating a setting profile including the corresponding Scan-to-HTTP setting information and storing the setting profile in the setting information database DB will be described. The Scan-to-HTTP setting process is performed prior to the Scan-to-HTTP process. Specifically, the Scan-to-HTTP setting information include the above described scanning option information (the setting information related to the scanning process, such as the file format), and the format information representing the format of the HTTP request including the scanned data.

FIG. 3 is a flow chart illustrating the Scan-to-HTTP setting process. When the browser program PG2 is activated in the personal computer 200, and the CPU 210 serving as a WEB browser designates a predetermined URL as a destination URL, thereby accessing the multi function apparatus 100A, the Scan-to-HTTP setting process starts. The predetermined URL is a URL representing an input screen for inputting the setting information related to the Scan-to-HTTP process.

In STEP S12, the CPU 210 transmits a request for input screen data representing an input screen, to the multi function apparatus 100A, by use of the predetermined URL and the destination URL. If the multi function apparatus 100A receives the input screen data request, in STEP S14, the CPU 110 transmits the input screen data as a response to the corresponding request, to the personal computer 200.

When the personal computer 200 receives the input screen data, in STEP S16, the CPU 210 displays an input screen WP1 represented by the input screen data, on the display unit 270.

FIG. 4 is a view illustrating an example of the input screen WP1. The input screen WP1 includes a field F1 for inputting a profile name. When one set of input information input on the input screen WP1 is registered as one setting profile, the profile name is used as the name of the setting profile. The profile name is determined by the user. As the profile name, for example, the name of a WEB service of a scanned data transmission destination can be used. In the example of FIG. 4, the name ("SN1") of the WEB service which is provided by the server 300A is used.

The input screen WP1 includes a format information area A1 for inputting format information representing an HTTP request format, and a scanning option area A2 for inputting the above described scanning option information (the setting information related to the scanning process).

The format information area A1 includes a plurality of fields F2 to F8 where arbitrary character strings (texts) are input by operations of the user on the user interface 160 such as the keyboard.

The field F2 is a field for inputting a HTTP request destination URL. Destination URLs are determined for the WEB services, respectively. In the example shown in FIG. 4, the URL of the WEB service which is provided by the server 300A is input.

The field F3 is a field for inputting a method to be included in an HTTP request. A method which can be used to upload scanned data is generally "POST" or "PUT".

The fields F4 and F5 are fields for inputting information defining the header of the HTTP request. Specifically, in the fields F4 and F5, additional information to be included in the header of the HTTP request is input. More specifically, each field F4 is a field for inputting an additional information item name, and each field F5 is a field for inputting an additional information value. In the example of FIG. 4, the format information area A1 includes three fields F4 and three fields F5, such that it is possible to input three additional information items. In the example of FIG. 4, in the first field F4 from the top, as an item name, "X-UPLOAD-FILENAME" is input. Also, the first field F5 from the top, as a value corresponding to the item name "X-UPLOAD-FILE-NAME", "_USER_TIME_.PDF" is input. This is additional information designating a scanned data file name.

The field F6 is a field for inputting information designating the format of the body of the HTTP request. Specifically, in the field F6, additional information and scanned data (a scan file) to be included in the body of the HTTP request are input in the order in which they will be included. In the example of FIG. 4, in the field F6, character strings "type=pdf", "tag=invoice", and "data=_File-DATA_:base64" corresponding to three rows are input. "type=pdf" and "tag=invoice" are additional information, and "type" and "tag" are item names of the additional information (file format information and tag information), and "pdf" and "invoice" are values corresponding to those item names. "data" is an item name representing scanned data, and "_File-DATA_" is a variable representing scanned data.

The information (specifically, character strings) which should be input in the fields F2 to F6, especially, item names are determined for WEB services of scanned data transmission destinations, and can differ depending on the WEB services. In general, the information which should be input in the fields F2 to F6 is described as an API (abbreviation for Application Programming Interface) by each WEB service. The user inputs the information which should be input in the fields F2 to F6, for example, with reference to a published API.

The fields F7 and F8 are fields for inputting authentication information for accessing a WEB service. Specifically, in the field F7, a user name is input, and in the field F8, a password is input. In the example of FIG. 4, in the field F7, as the user name, "_USER_:base64" is input, and in the field F8, as the password, "_PASS_:base64" is input.

Here, the user can input character strings (hereinafter, referred to simply as variables) which are variables, as values which are input in the fields F2 to F8 (specifically, values which are input in the fields F5 and values which are input in the fields F6 and F7). In the present embodiment, as a variable, a character string having underbars "_" attached to its start and its end is used. In the example of FIG. 4, "_TIME_", "_USER_", "_PASS_", and "_File-DATA_" are variables. Each of these variables is substituted with specific information of a type represented by the corresponding variable, in an actual HTTP request. For example, the variable "_TIME_" is substituted with information representing time when the scanned data is uploaded (that is, when the HTTP request is transmitted). The variable "_USER_" is substituted with a user name registered in advance in the multi function apparatus 100A in association with a user logging in to the multi function apparatus 100A when the scanned data is uploaded. The variable "_PASS_" is substituted with a password registered in advance in the multi function apparatus 100A in association with the user name of the user logging in to the multi function apparatus 100A when the scanned data is uploaded. The variable "_File-DATA_" is substituted with the scanned data (a scan file) which needs to be uploaded, when the scanned data is uploaded. Likewise, the variables can be referred to as type information representing the type of information to be substituted. Also, it can be said that variables such as "_USER_" and "_PASS_" are information which are determined for each multi function apparatus, that is, device-dependent information which can differ depending on the multi function apparatuses (devices).

Also, the user is allowed to add information designating a system for encoding specific information of a type represented by each of those variables, to the end of the corresponding variable. For example, in FIG. 4, the character string "_File-DATA_:base64" input in the third row of the field F6 represents that the scanned data which is substituted for the variable "_File-DATA_" in an actual HTTP request should be encoded using an encoding system called "base64". Even with respect to other information which is transmitted when the scanned data is transmitted (uploaded), that is, other information which is included in the HTTP request, it is possible to designate an encoding system. For example, with respect to all or some of the file name, the authentication information (the password and/or the user name), and the destination URL of the scanned data, an encoding system can be designated.

The types of the variables which are allowed to be input in the fields F2 to F8, the types of encoding systems of the variables, and formats for inputting those information items are determined in advance by the vendor of the multi function apparatus 100A. Examples of the formats include a format in which an encoding system should be input next to a variable with a colon ":" interposed therebetween like the above described character string "_File-DATA_:base64". For example, information on the variables, the types of encoding systems, and the formats are described in a manual which is provided from the vendor to the user. For example, with reference to the corresponding manual, the user inputs information (character strings) in the fields F2 to F8.

The scanning option area A2 includes a plurality of pull-down menus M1 to M4 for inputting scanning options for generating scanned data. Each pull-down menu is a kind of input element (UI element), and is a selection area for selecting one specific option from a plurality of options prepared in advance. The user can operate the pull-down menus M1 to M4, thereby inputting scanning options represented by corresponding specific options. The pull-down menu M1 is a menu for inputting options related to the image quality of a scan image to be represented by scanned data, specifically, a color/black-and-white option and a scan resolution option. The pull-down menu M2 is a menu for inputting a file format option for scanned data. Examples of selectable file format options include PDF, JPEG, and TIFF. The pull-down menu M3 is a menu for inputting a size (document size) option for a scan image which is represented by scanned data. Examples of setting option for document size include A4, A3, B5, a letter size, and a legal size. The pull-down menu M4 is a menu for inputting a data size option (in other words, a compression level) for scanned data. Examples of selectable data sizes include a large size, a medium size, and a small size. Also, in place of the pull-down menus M1 to M4, selection areas which are configured by input elements having another form like radio buttons may be used.

As can be understood from the above description, the Scan-to-HTTP setting information which are input through the input screen WP1 include first type setting information (specifically, the format information) which differ depending on the WEB services of the scanned data transmission destinations and have relatively low commonality between the plurality of WEB services, like additional information which need to be included in HTTP requests. Also, the setting information which are input through the input screen WP1 include second type setting information (specifically, the scanning option information) which do not depend on the WEB services of the scanned data transmission destinations and have relatively high commonality between the plurality of WEB services, like the options related to the scanning process. Further, with respect to the first type setting information, as a user interface, the fields F2 to F8 where it is possible to input arbitrary character strings are used. Further, with respect to the second type setting information, as a user interface, the pull-down menus M1 to M4 where it is possible to select one from a plurality of prepared options are used. As a result, according to the types of Scan-to-HTTP setting information to be input, appropriate user interfaces are used. Therefore, the user can input appropriate Scan-to-HTTP setting information through the input screen WP1.

The input screen WP1 further includes a read button BT1, a cancellation button BT2, a registration button BT3, and a test transmission button BT4.

The read button BT1 is a button for instructing an instruction for reading registered setting profiles. For example, if the user inputs a registered setting profile name in the field F1 and presses the read button BT1, a list of registered setting profiles (not shown) is displayed. Thereafter, a registered setting profile selected from the list by the user is read from the setting information database DB. The name of the read setting profile is displayed in the field F1 of the input screen WP1. Also, the content of the read setting profile (a set of Scan-to-HTTP setting information) is displayed in the fields F2 to F8 and the pull-down menus M1 to M4 of the input screen WP1. The user can freely edit the content of the read setting profile displayed on the input screen WP1. That is, the multi function apparatus 100A can receive changes to the content of the read setting profile through the input screen WP1, thereby registering a new setting profile. Examples of the new setting profile include a setting profile for transmitting the scanned data to a transmission destination different from the scanned data transmission destination included in the read setting profile.

The cancellation button BT2 is a button for issuing an instruction for canceling the Scan-to-HTTP setting information input on the input screen WP1. If the user presses the cancellation button BT2, for example, information input in the fields F2 to F8 of the input screen WP1 are deleted.

The registration button BT3 is a button for issuing an instruction for registering a setting profile. If the registration button BT3 is pressed, at that moment, the set of Scan-to-HTTP setting information (that is, a setting profile) input in the fields F1 to F8 and the pull-down menus M1 to M4 of the input screen WP1 is registered as will be described below.

The test transmission button BT4 is a button for issuing an instruction for performing test transmission to be described below. If the test transmission button BT4 is pressed, test transmission is performed as will be described below.

Now, a case where in a state where the input screen WP1 is displayed, the registration button BT3 is pressed and then the test transmission button BT4 is pressed will be described as an example. This order may be reversed.

When the registration button BT3 is pressed, in STEP S18 of FIG. 3, the CPU 210 transmits a setting profile input in the input screen WP1 at that moment, to the multi function apparatus 100A. If the multi function apparatus 100A receives the setting profile, in STEP S20, the CPU 110 registers the corresponding setting profile. That is, the setting profile is newly stored in the setting information database DB. In STEP S22, the CPU 110 transmits a registration completion notification to the personal computer 200.

When the test transmission button BT4 is pressed, in STEP S24, the CPU 210 transmits a test transmission instruction to the multi function apparatus 100A. When the multi function apparatus 100A receives the test transmission instruction, the CPU 110 transmits a HTTP request for testing communication with the server 300A, to the server 300A. To this end, the CPU 110 generates test data TD in STEP S25. The test data TD is generated without reading a document by the scanner unit 150. Specifically, the CPU 110 generates the test data TD (a test file) according to the scanning options included in the setting profile registered in STEP S20, using previously prepared dummy data (for example, RGB image data representing a predetermined dummy image). Therefore, the generated test data TD has the file same format (for example, PDF) as that of the scanned data (the scan file) which is generated according to the corresponding setting profile in the scanning process (STEP S1) of the above described Scan-to-HTTP process (FIG. 2).

In STEP S26, the CPU 110 performs a storing process of storing the test data TD (the test file) generated in STEP S25, in an HTTP request having the format according to the format information included in the registered setting profile. At this time, a file name included in the HTTP request is overwritten with the file name of the test data TD. This storing process is the same as the storing process which is performed using scanned data in STEP S2 of the above described Scan-to-HTTP process (FIG. 2), except that it uses the test data TD.

By the storing process, an HTTP request RQ including the test data TD and having the format according to the format information included in the registered setting profile is generated.

FIGS. 5A and 5B are views illustrating an HTTP request RQ and an HTTP response RS, respectively. FIG. 5A shows an example of the HTTP request RQ which is generated in a case where the setting profile input on the input screen WP1 of FIG. 4 is used. The HTTP request RQ includes a header RQH and a body RQB.

In the example of FIG. 5A, it can be seen that the header RQH has the format according to the information input in the fields F2 to F5 of the input screen WP1 of FIG. 4. For example, in the first row L1 of the header RQH, "POST" input as a method in the field F3 is included. Also, in the first row L1 and second row L2 of the header RQH, a HTTP request RQ is defined using the destination URL input in the field F3. Further, in the fourth row L4 of the header RQH, the file name of the test data TD is described according to the information input in the fields F4 and F5. That is, it can be seen that, in the fourth row L4 of the header RQH, a name which is a combination of a user name "Alice" and information "201406301150" representing the generation time of the test data TD is described as the file name of the test data TD. Furthermore, in the fifth row L5 of the header RQH, according to information input in the fields F7 and F8, the authentication information (the user name and the password) encoded by the "base64" system is described.

Also, in the example of FIG. 5A, it can be seen that the body RQB has the format according to the information input in the field F6 of the input screen WP1 of FIG. 4. That is, the body RQB includes character strings "type=pdf", "tag=invoice", and "data=", and the test data (test file) TD encoded by the "base64" system.

In STEP S28, the CPU 110 uploads the test data TD. That is, the CPU 110 transmits the HTTP request RQ including the test data TD, to a server designated by the destination URL included in the HTTP request RQ. Here, on the assumption that the transmission destination (uploading destination) server is the server 300A (FIG. 1), a description will be made.

If the server 300A receives the HTTP request RQ including the test data TD, in STEP S30, the CPU of the server 300A performs a storing process. This storing process is the same process as the storing process of STEP S4 of the Scan-to-HTTP process (FIG. 2).

In STEP S32, the CPU of the server 300A transmits a response representing the result of transmission of the test data TD, to the multi function apparatus 100A. For example, in a case where the test data TD is received by the server 300A without problems, and is stored in a storage unit of the server 300A without problems, the transmission result response includes information representing success of uploading of the test data TD. Meanwhile, for example, in a case where the test data TD is not received by the server 300A or is not stored in a storage unit of the server 3 due to an error, the transmission result response includes information representing failure of uploading of the test data TD.

The response representing the transmission result is specifically an HTTP response RS to the HTTP request RQ. An example of the HTTP response RS is shown in FIG. 5B. The HTTP response RS includes a header RSH and a body RSB. In the example of FIG. 5B, the header RSH includes a status code "200 OK" representing that the request was successful, and the body RSB includes a message SM representing that the transmission result is successful. These information items which are included in HTTP responses RS can differ depending on the WEB services. For this reason, unless there are dedicated different programs for the WEB services, respectively, it is difficult for the CPU 110 of the multi function apparatus 100A or the CPU 210 of the personal computer 200 to interpret those information items.

In STEP S34, the CPU 110 transmits transmission result notification screen data to the personal computer 200. This notification screen data represents a notification screen WP2 for notifying information representing the result of the transmission of the test data TD to the server 300A. If the personal computer 200 receives the notification screen data, in STEP S36, the CPU 210 displays the notification screen WP2 based on the notification screen data, on the display unit 270.

FIG. 6 is a view illustrating an example of the notification screen WP2. As shown in FIG. 6, in an upper area ARQ of the notification screen WP2, the information (character strings) included in the HTTP request RQ of FIG. 5A is shown as it is. Also, in the upper area ARQ of the notification screen WP2, the information (character strings) included in the HTTP response RS of FIG. 5B is shown as it is. The CPU 210 of the personal computer 200 or the CPU 110 of the multi function apparatus 100A cannot interpret the HTTP response RS. For this reason, it is up to the user to interpret the HTTP response RS and determine whether the transmission of the test data TD was successful. The user can see the content of the HTTP request RQ and the HTTP response RS as it is by watching the notification screen WP2. If a button BT5 of the notification screen WP2 is pressed, the notification screen WP2 is deleted, and the input screen WP1 is displayed again on the display unit 270.

In a case of determining that the transmission of the test data TD was successful, based on the notification screen WP2, the user finishes the Scan-to-HTTP setting process, for example, by finishing the browser program. In a case of determining that the transmission of the test data TD was failed, based on the notification screen WP2, for example, the user can change the Scan-to-HTTP setting information such as the format information input on the input screen WP1. Thereafter, the user may request transmission of the test data TD again, using a changed setting profile (a set of Scan-to-HTTP setting information).

As described above, in the Scan-to-HTTP setting process (FIG. 3), the multi function apparatus 100A provides the input screen WP1 for inputting the setting information related to the Scan-to-HTTP process, to the personal computer 200 (STEP S14 of FIG. 3). The input screen WP1 is a screen for inputting format information defining a format for transmission data for transmitting the scanned data to a server, that is, an HTTP request which stores the scanned data and is transmitted to a server (FIG. 4). The input format information includes format information defining a format for additional information which is stored together with the scanned data in the HTTP request. The format information for the additional information includes an additional information item name (for example, "X-UPLOAD-FILE-NAME" of FIG. 4 or "tag"), and an additional information value (for example, "_USER_TIME_.pdf" or "invoice") corresponding to the additional information item name. Thereafter, in the Scan-to-HTTP process (FIG. 2), the multi function apparatus 100A generates transmission data (specifically, an HTTP request) having the format according to the format information included in the setting profile input through the input screen WP1, and stores the scanned data in the corresponding HTTP request (STEP S2 of FIG. 2). Thereafter, the multi function apparatus 100A transmits the corresponding HTTP request to the server, thereby transmitting the scanned data to the server (STEP S3 of FIG. 2). As a result, the multi function apparatus 100A can receive information related to formats which can differ depending on servers, for example, an item name to be given to additional information, through the input screen, and thus can transmit scanned data in an appropriate format to a server.

More specifically, in the related art, a transmission program based on an API published for each server (WEB service) is prepared for the corresponding server. Thereafter, the corresponding transmission program is executed, whereby scanned data is uploaded to the corresponding server. This transmission program may be executed by a multi function apparatus or may be executed by a relay apparatus (for example, a relay server) for relaying transmission of scanned data from a multi function apparatus to a server. In contrast to this, the multi function apparatus 100A of the present embodiment can transmit scanned data in an appropriate format to each server without using a transmission program which is prepared for the corresponding server. Therefore, it is possible to reduce resources (for example, an amount of memory) of the multi function apparatus 100A necessary for transmitting scanned data from the multi function apparatus 100A to a server. Further, it is possible to simplify a system for transmitting scanned data from the multi function apparatus 100A to a server. Furthermore, if the user inputs Scan-to-HTTP setting information such as format information, with respect to a server (a WEB service) for which a transmission program has not been prepared, through the input screen WP1, it is possible to transmit scanned data to the corresponding server.

Also, before storing scanned data in an HTTP request having the format according to the format information input through the input screen WP1 in the Scan-to-HTTP process of FIG. 2 and transmitting the HTTP request, the multi function apparatus 100A stores the test data TD in an HTTP request having the format according to the format information and transmits the HTTP request to a server (STEPS S25 to S28 of FIG. 3). As a result, it is possible to check in advance whether it is possible to appropriately transmit scanned data to the server using the setting profile input through the input screen WP1.

Also, in the test transmission, the multi function apparatus 100A generates the test data TD to be stored in an HTTP request (STEP S25 of FIG. 3), without using the scanner unit 150. This test data TD has the same format as that of scanned data to be transmitted in the Scan-to-HTTP process. As a result, it is possible to appropriately check in advance whether it is possible to appropriately transmit scanned data to the server, without generating scanned data.

Also, the multi function apparatus 100A transmits the screen data representing the notification screen WP2 (FIG. 6) including the result information representing the result of transmission of the test data TD to the server, to the personal computer 200 (STEP S36 of FIG. 3). The result information which is included in the notification screen WP2 includes a response (for example, the HTTP response RS of FIG. 5B) received with respect to the HTTP request including the test data TD from the server. As a result, the user can appropriately determine whether the transmission of the test data TD to the server was successful or not. That is, although the multi function apparatus 100A does not retain a transmission program based on an API published for the server (the WEB service), and thus cannot determine whether the transmission of the test data TD to the server was successful or not, the user can appropriately perform the corresponding determination with reference to the notification screen WP2.

Similarly, even in STEP S6 of the Scan-to-HTTP process of FIG. 2, as a notification screen including information representing the transmission result of the scanned data, a screen similar to the notification screen WP2 of FIG. 6 is displayed on the display unit 170. As a result, the user can appropriately perform determination on whether the transmission of the scanned data to the server was successful or not.

Also, the format information which is input through the input screen WP1 includes information designating a system for encoding the scanned data (for example, ":base64" of the character string "_File-DATA_:base64" in the field F6 of FIG. 4). Further, the format information includes information (for example, ":base64" of the character string "_USER_:base64" in the field F7 of FIG. 4) designating a system for encoding at least a portion (for example, the authentication information or the file name) of the additional information to be transmitted to the server during transmission of the scanned data. As a result, it is possible to appropriately encode the scanned data and the additional information and then transmit them to the server. For example, it is possible to encode scanned data and additional information by an encoding system permitted to be used in an API published for each server (a WEB service), and then transmit them to the corresponding server.

Also, the input screen WP1 includes input areas (specifically, the fields F2 to F6 of FIG. 4) which are input areas for inputting format information and where arbitrary character strings can be input by the user. Especially, in the fields F4 and F6, it is possible to input arbitrary character strings as additional information item names. As a result, it is possible to flexibly cope with WEB services which can require various formats together with additional information item names which differ depending on the WEB services. As a result, it is possible to improve versatility of the Scan-to-HTTP process.

Also, the input screen WP1 includes selection areas (specifically, the pull-down menus M1 to M4 of FIG. 4) for selecting one specific option from a plurality of options, as input elements for inputting scanning options. It is unlikely that the scanning options will differ depending on the WEB services, and selectable scanning options are often determined in advance according to the specification of the scanner unit 150 and so on. According to the present embodiment, the user can easily set scanning options.

Now, a collective setting process will be described. The collective setting process is a process which the CPU 210 serving as the device manager and the multi function apparatuses 100A to 100C perform in cooperation with one another in a state where the device management program PG3 of the personal computer 200 is active. The collective setting process is a process of collectively setting information set in a specific device (also referred to as a master device) in one or more other devices (also referred to as copy devices). Hereinafter, a case of setting one or more sets of Scan-to-HTTP setting information (that is, one or more setting profiles) set in the multi function apparatus 100A in two multi function apparatuses 100B and 100C will be described.

Figure 8A:
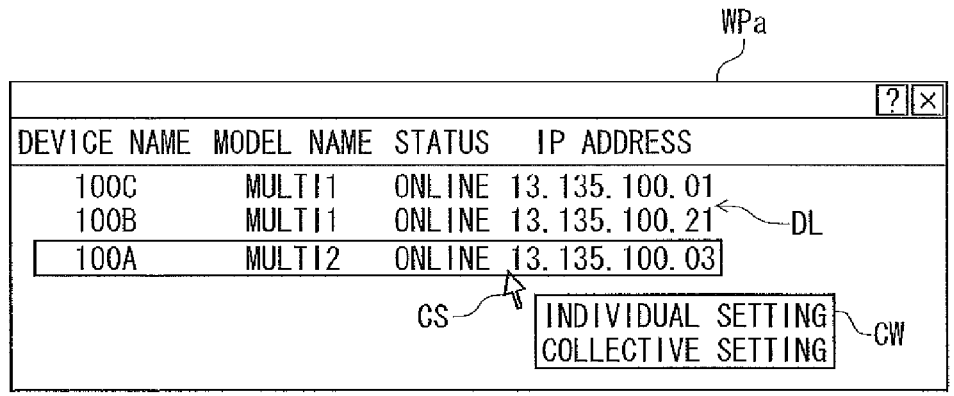
FIGS. 8A and 8B are views illustrating examples of UI screens in the collective setting process.
Figure 8B:
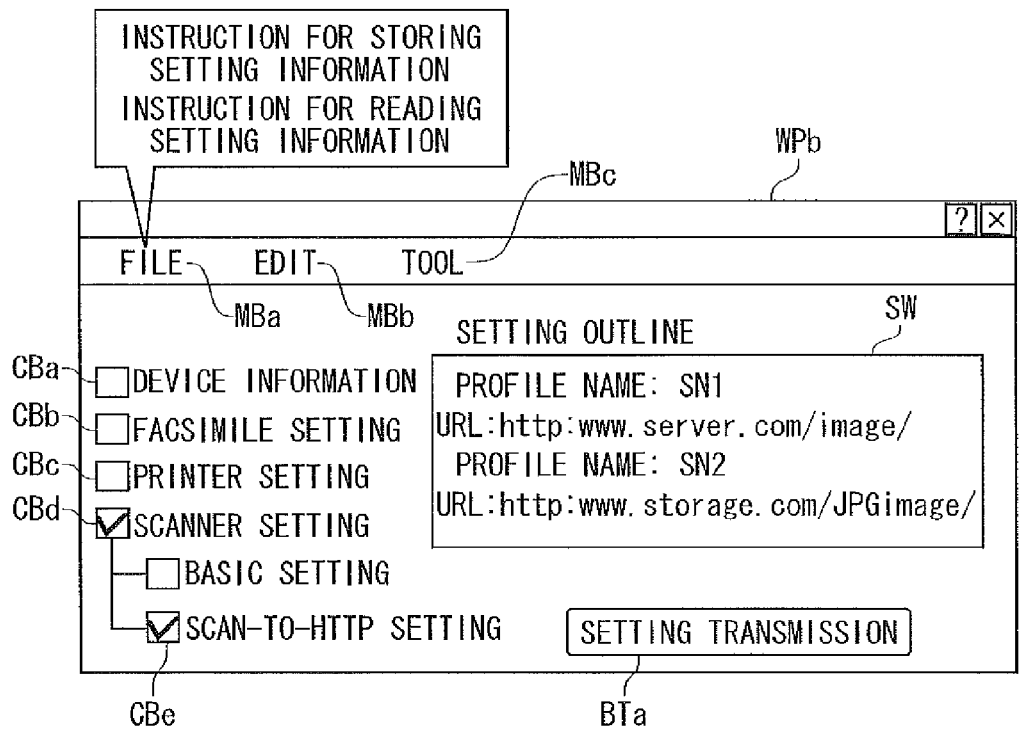

FIG. 7 is a flow chart illustrating the collective setting process. FIGS. 8A and 8B are views illustrating examples of UI screens in the collective setting process. If the device management program PG3 is activated in the personal computer 200, in STEP S50, the CPU 210 displays a device selection screen WPa as shown in FIG. 8A, on the display unit 270. In the device selection screen WPa, a list DL of management object devices of the CPU 210 serving as the device manager is displayed. For example, management object devices are registered in advance. Alternatively, the CPU 210 may broadcast a search packet on the LAN 70, thereby searching for management object devices. In the example of FIG. 8A, the multi function apparatuses 100A to 100C are displayed as management object devices.

The user selects one master device as a processing object and inputs an individual setting command, on the device selection screen WPa. For example, as shown in the example of FIG. 8A, the user selects the multi function apparatus 100A as a master device and selects an "INDIVIDUAL SETTING" command from a command window CW, by operating a cursor CS by use of a pointing device such as a mouse.

When the individual setting command is input, in STEP S52, the CPU 210 displays a device management screen WPb shown in FIG. 8B. The device management screen WPb includes a plurality of menu buttons MBa to MBc, a plurality of check boxes CBa to CBe, a setting display window SW, and a setting transmission button BTa. The plurality of menu buttons MBa to MBc is buttons for displaying menus for inputting various instructions. The plurality of check boxes CBa to CBe is check boxes for selecting processing object setting information.

As shown in FIG. 8B, the user selects setting profile for the Scan-to-HTTP process, as processing object setting information, by checking the check boxes CBd and CBe.

When setting profiles for the Scan-to-HTTP process are selected, in STEP S53, the CPU 210 transmits a setting profile request to the multi function apparatus 100A selected as a processing object. When the multi function apparatus 100A acquires the corresponding request, the CPU 110 of the multi function apparatus 100A transmits all setting profiles stored in the setting information database DB of the multi function apparatus 100A, to the personal computer 200. At this time, variables (such as "_USER_" and "_PASS_" described above) included in Scan-to-HTTP setting information included in the setting profiles are transmitted as they are to the personal computer 200. An outline of the setting profiles received by the personal computer 200 is displayed in the setting display window SW, for example, as shown in FIG. 8B.

The user selects a menu "STORING OF SETTING INFORMATION" from menus corresponding to the menu button MBa, thereby inputting an instruction for storing the received setting profiles. When the corresponding storing instruction is input, in STEP S56, the CPU 210 stores the received setting profiles. Specifically, the received setting profiles are stored as one file in the non-volatile storage unit 220 included in the personal computer 200.

Subsequently, based on an operation of the user, in STEP S58, the CPU 210 displays the device selection screen WPa again.

The user selects one or more copy devices as processing objects and then inputs a collective setting command, on the device selection screen WPa. For example, the user selects two multi function apparatuses 100B and 100C as copy devices and selects a "COLLECTIVE SETTING" command from the command window CW, by operating the cursor CS.

When the collective setting command is input, the CPU 210 re-displays the device management screen WPb shown in FIG. 8B.

The user selects a menu "READING OF SETTING INFORMATION" from the menus corresponding to the menu button MBa, and inputs a setting profile read instruction.

When the setting profile read instruction is input, in STEP S62, the CPU 210 reads the setting profiles saved in STEP S56, from the non-volatile storage unit 220, and stores them in the buffer area 231 of the volatile storage unit 230. An outline of the read setting profiles is displayed in the setting display window SW, for example, as shown in FIG. 8B.

The user confirms the display of the setting display window SW, and then presses the setting transmission button BTa, thereby inputting a setting transmission instruction. The setting transmission instruction is input, the CPU 210 transmits the setting profiles to each of the copy devices.

Specifically, in STEP S64, the CPU 210 transmits the setting profiles to the multi function apparatus 100B. If the multi function apparatus 100B receives the setting profiles, in STEP S66, the CPU 110 of the multi function apparatus 100B registers the corresponding setting profiles as they are. That is, the CPU 110 of the multi function apparatus 100B stores the corresponding setting profiles in the setting information database DB. As a result, it becomes possible to perform a Scan-to-HTTP process using the corresponding setting profiles, in the multi function apparatus 100B. In STEP S68, the CPU 110 of the multi function apparatus 100B transmits a setting profile registration completion notification to the personal computer 200.

Similarly, in STEP S70, the CPU 210 transmits the setting profiles to the multi function apparatus 100C. In STEP S72, the CPU 110 of the multi function apparatus 100C registers the received setting profiles. In STEP S74, the CPU 110 of the multi function apparatus 100C transmits a registration completion notification to the personal computer 200.

According to the collective setting process described above, the user can easily register setting profiles registered in one master device (for example, the multi function apparatus 100A), in one or more copy devices (for example, the multi function apparatuses 100B and 100C). As a result, it is possible to reduce a burden of the user, and improve the convenience of the multi function apparatuses 100A to 100C for the user.

In the collective setting process, the multi function apparatus 100A serves as the master device transmits the setting profiles including the format information, to an external device (specifically, the personal computer 200) (STEP S54 of FIG. 7), without substituting the variables included in the format information with specific device-dependent information. Therefore, the external device can be used to register the received format information in other devices. A case where it is impossible to use variables to input format information to the input screen WP1, or a case where variables included in format information is substituted with specific information and the format information is transmitted to an external device is assumed. In this case, some processes such as a process of changing specific device-dependent information, included in format information of a setting profile to be transmitted to each copy device, for the corresponding copy device are required, and thus it is inconvenient. According to the collective setting process of the present embodiment, that problem does not occur.

That is, the multi function apparatuses 100B and 100C serves as copy devices need only to register the individual profiles received from the master device as they are (STEPS S66 and S72 of FIG. 7). That is, the format information including variables is stored in the setting information database DB of each of the multi function apparatuses 100B and 100C, without being changed. As a result, it is possible to reduce a burden of the user for inputting format information and a processing load on each of the multi function apparatuses 100B and 100C.

Also, in the above described collective setting process, a case where the master device is the multi function apparatus 100A and the copy devices are the multi function apparatuses 100B and 100C has been described as an example. However, each of the multi function apparatuses 100A to 100C can act as a master device or can act as a copy device.

In the input screen WP1 (FIG. 4) of the first embodiment described above, in the format information area A1, all format information are input in the fields F2 to F8 where arbitrary character strings can be input. Alternatively, some information of the format information may be specifically input using a selection area for selecting one specific option from a plurality of options prepared in advance.

Figure 9:
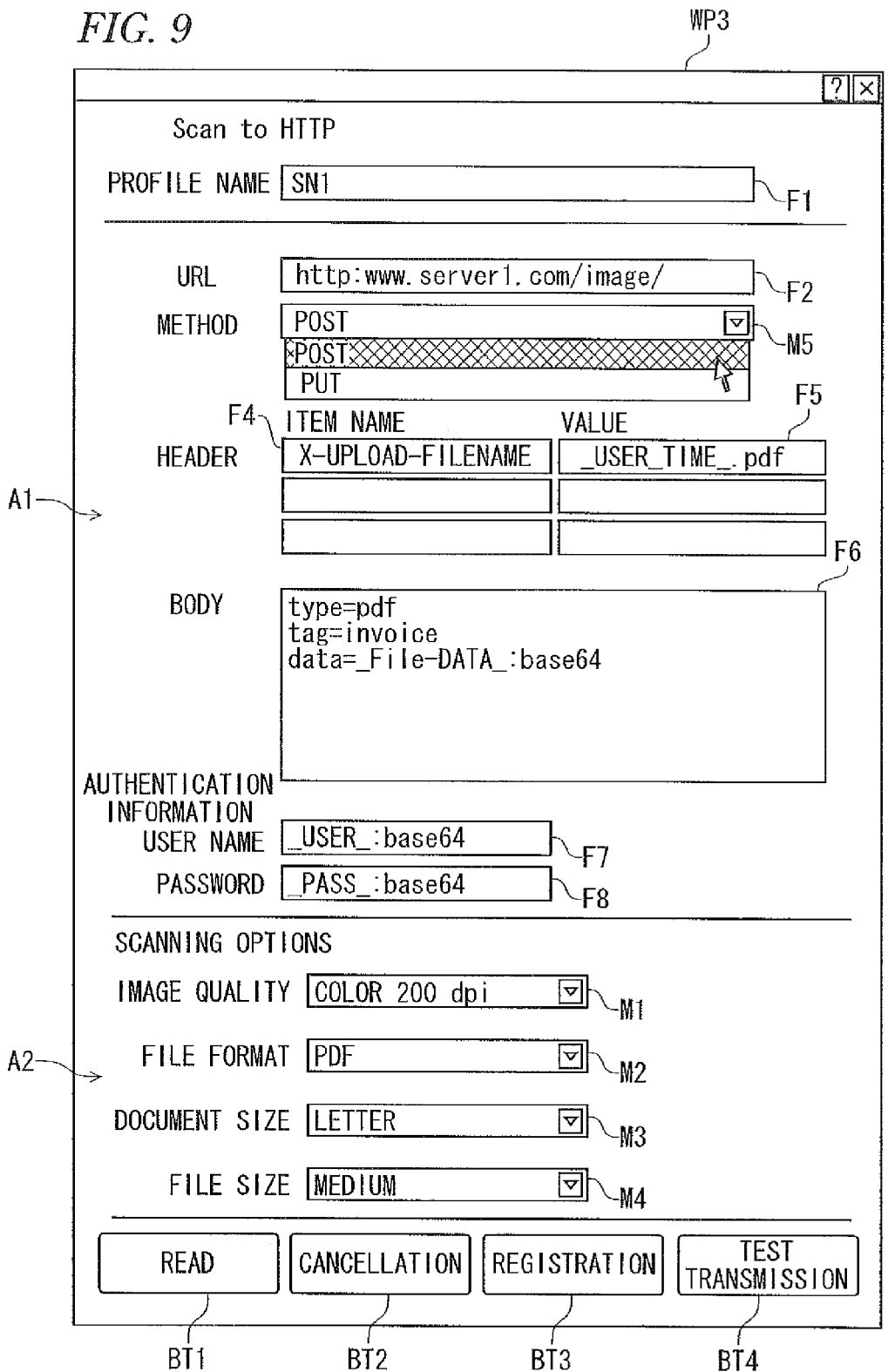
FIG. 9 is a view illustrating an example of an input screen WP3 of a second embodiment.

FIG. 9 is a view illustrating an example of an input screen WP3 according to a second embodiment. The input screen WP3 includes a pull-down menu M5 as a selection area for inputting a method, in place of the method input field F3 of the input screen WP1 of FIG. 4. It can be said that a method is information representing an instruction to a server. Information which can be input as methods are limited types of information defined in advance by a communication protocol (HTTP in the present embodiment). Specifically, as methods which can be included in HTTP requests for transmitting scanned data, "POST" and "PUT" are general.

Therefore, in the pull-down menu M5 of the input screen WP3, any one of an option representing "POST" and an option representing "PUT" can be selected. The configuration of the other portion of the input screen WP3 is the same as that of the input screen WP1 of FIG. 4.

In other words, the input screen WP3 of the second embodiment includes first areas (specifically, the field F2 and the fields F4 to F8) where arbitrary character strings can be input by the user, as areas for inputting first type format information items of the format information, and includes a second area (specifically, the pull-down menu M5) for selecting one specific information item from the plurality of options, as an area for inputting a second type format information item of the format information. As a result, according to the type of each format information item, the corresponding format information item can be input through an appropriate area in the input screen WP3. Therefore, it is possible to reduce a burden of the user.

More specifically, the first type format information items include additional information item names which can be input using the field F2 or the field F6. Also, the second type format information item includes an instruction (specifically, a method) which can be input using the pull-down menu M5 so as to be issued to a server defined according to a communication protocol. As a result, through the input screen WP3, additional information item names which can be freely determined by the provider of a WEB service can be appropriately input, and a method which is a limited kind of information can be appropriately input. Further, since a method is input using the pull-down menu M5, it is possible to reduce an input burden of the user as compared to a case where a method is input through a field.

Some modifications to the above described embodiment will be described in below.

(1) In the Scan-to-HTTP setting process (FIG. 3) of the embodiment described above, the CPU 110 of the multi function apparatus 100A provides the input screen WP1 in a WEB page form to the personal computer 200 (STEP S14 of FIG. 3). Thereafter, the CPU 110 of the multi function apparatus 100A acquires a setting profile through the input screen WP1, and registers the corresponding setting profile in the setting information database DB. Alternatively, the CPU 210 of the personal computer 200 may provide the input screen WP1 as a UI screen of the device manager. That is, the CPU 210 serving as the device manager displays the input screen WP1 on the display unit 270. Thereafter, the CPU 210 serving as the device manager receives setting information such as format information from the user through the input screen WP1. Thereafter, the CPU 210 serving as the device manager may transmit the Scan-to-HTTP setting information (the setting profile) received from the user, to the multi function apparatus 100A, such that the corresponding setting profile is stored in the setting information database DB of the multi function apparatus 100A. In other words, the Scan-to-HTTP setting process of the embodiment described above is performed by a function which is implemented by the computer program PG1 stored in the multi function apparatus 100A. Meanwhile, the Scan-to-HTTP setting process of the present modification is performed by a function which is implemented by the device management program PG3 stored in the personal computer 200 serving as a terminal device connected to the multi function apparatus 100A such that communication is possible.

(2) In the Scan-to-HTTP setting process of the embodiment described above, the information items (character strings) input in the fields F2 to F6 of the input screen WP1 are included as they are in the HTTP request RQ (FIG. 5A) in the test data transmission (STEP S28 of FIG. 3) or the scanned data transmission (STEP S3 of FIG. 2) from the multi function apparatus 100A to a server. Alternatively, the CPU 110 may check the information items input in the fields F2 to F8, especially, additional information items input in the fields F4 and F5, and may not include information items which will obviously disturb communication between the multi function apparatus 100A and the server, in the HTTP request RQ. Examples of these information items include an information item which should be dynamically determined in communication between the multi function apparatus 100A and the server, and an information item which should not be changed since a standard has been determined. These information items are, for example, additional information items such as "Connection", "transfer-encoding", and "Content-Length".

(3) In the above described embodiment, the CPU 110 generates the test data TD (the test file), using the dummy data (STEP S25 of FIG. 3). Alternatively, the volatile storage unit 130 may store the test data TD in advance, and the CPU 110 may acquire the corresponding test data TD from the volatile storage unit 130. For example, a plurality of test data items TD having a plurality of conceivable file formats (such as PDF, JPEG, and BMP) may be stored in the volatile storage unit 130 in advance, and the CPU 110 may acquire a test data item TD having the same file format as that of scanned data to be generated according to a setting profile, from the volatile storage unit 130.

(4) In the above described embodiment, some processing steps of the Scan-to-HTTP setting process (FIG. 2) can be appropriately changed. For example, the processes of STEPS S24 to S36 related to test data transmission can be omitted. Also, the Scan-to-HTTP setting information items which are included in the input screen WP1 of FIG. 4 are examples, and can be appropriately changed. For example, the input screen WP1 may not include the pull-down menus M1 to M4 for inputting scanning options. In this case, scanning options may be sequentially set during performance of the Scan-to-HTTP process, or pre-set basic scanning-related options may be used during performance of the Scan-to-HTTP process.

(5) In each above described embodiment, some of components implemented by hardware may be replaced with software, and conversely, some or all of components implemented by software may be replaced with hardware.

Although the present disclosure has been described based on the embodiment and the modifications, the above described mode for carrying out the present disclosure is to enable a better understanding of the present disclosure but does not limit the scope of the present disclosure. The present disclosure may include alterations, changes, and modifications of the embodiment without departing from the gist of the present disclosure and the scope of claims, and also includes equivalents thereof.

Also, the configuration which is disclosed in this disclosure may be implemented in various forms besides the above described image reading apparatus, and can be implemented in forms such as a system including the image reading apparatus, a control method of the image reading apparatus, computer programs for realizing the image reading apparatus, the system, or the control method, and recording media with those computer programs.

What is claimed is:

1. An image reading apparatus comprising:
a scanner unit configured to optically scans a document;
a communication interface configured to be connectable with a network and establishes communication with a server including a first server that provides a first service and a second server that provides a second service;
a processor; and
memory storing computer readable instructions that, when executed by the processor, causing the image reading apparatus to perform:
image reading processing of controlling the scanner unit to optically scans a document and generating scanned data;
input screen providing processing of providing an input screen for allowing a user to input format information defining a particular file format of an HTTP request that contains the scanned data, wherein the format information includes additional information and wherein the input screen includes a first field for inputting item name of the additional information to be included in a header of the HTTP request and a second field for inputting a value of the additional information to be included in the header of the HTTP request, the value corresponding to the item name of the additional information;
receiving processing of receiving the format information with the item name and the value of the additional information input by the user through the input screen
data generating processing of:
generating a first HTTP request as the HTTP request when a first format information as the format information corresponding to the first service is received, wherein the generated first HTTP request contains the scanned data and has the particular file format according to the first format information received in the receiving processing; and
generating a second HTTP request as the HTTP request when a second format information as the format information corresponding to the second service is received, wherein the generated second HTTP request contains the scanned data and has the particular file format according to the second format information received in the receiving processing; and
data transmitting processing of transmitting the first HTTP request generated in the data generating processing to the first server through the communication interface when the first HTTP request is generated, and transmitting the second HTTP request generated in the data generating processing to the second server through the communication interface when the second HTTP request is generated.

2. The image reading apparatus according to claim 1, wherein the memory stores the computer readable instructions that, when executed by the processor, further causing the image reading apparatus to perform:
test data generating processing of generating the HTTP request that contains test data before generating the HTTP request that contains the scanned data; and
test data transmitting processing of transmitting the HTTP request generated in the test data generating processing to the server.

3. The image reading apparatus according to claim 2, wherein the test data is image data which is generated without using the scanner unit and has the particular file format, and
wherein the test data transmitting processing is performed before performing the image reading processing.

4. The image reading apparatus according to claim 2, wherein the memory stores the computer readable instructions that, when executed by the processor, further causing the image reading apparatus to perform:
first screen providing processing of providing a first screen for displaying first result information that represents a result of the transmission of the test data to the server and a response received from the server with respect to the transmission of the HTTP request containing the test data.

5. The image reading apparatus according to claim 1, wherein the memory stores the computer readable instructions that, when executed by the processor, further causing the image reading apparatus to perform:
second screen providing processing of providing a second screen for displaying second result information that represents a result of the transmission of the scanned data to the server and a response received from the server with respect to the transmission of the HTTP request containing the scanned data.

6. The image reading apparatus according to claim 1, wherein the format information which is input through the input screen includes information designating a system for encoding at least one of the scanned data and the additional information.

7. The image reading apparatus according to claim 1, wherein the format information which is input through the input screen includes type information representing an information type, and
wherein the memory stores the computer readable instructions that, when executed by the processor, further causing the image reading apparatus to perform:
in the data generating processing, substituting the type information included in the format information with specific information of the type represented by the type information, and generating the HTTP request including the specific information, the specific information being preset information for the image reading apparatus; and
format information transmitting processing of transmitting the format information to an external device through the communication interface without substituting the type information included in the format information with the specific information.

8. The image reading apparatus according to claim 7, wherein the memory stores the computer readable instructions that, when executed by the processor, further causing the image reading apparatus to perform:
format information receiving processing of receiving another format information input to another image reading apparatus and including type information; and
in the data transmitting processing, generating another HTTP request having another file format according to the another format information received in the format information receiving processing from the another image reading apparatus.

9. The image reading apparatus according to claim 1, wherein the first field is configured to allow the user to input an arbitrary character string in the input area as the item name of the additional information.

10. The image reading apparatus according to claim 1, wherein the input screen includes a third field configured to allow the user to select one specific scanning option from among a plurality of options for generating the scanned data.

11. The image reading apparatus according to claim 1,
wherein the first field is configured to allow the user to input an arbitrary character string as the item name of the additional information, and
wherein the input screen includes a fourth field configured to allow selecting one specific information item from among a plurality of options as the information item representing an instruction defined to be issued to the server by a communication protocol.

12. The image reading apparatus according to claim 1,
wherein the service provided by the server is a service for storing image data sent from the image reading apparatus through the network, and
wherein the format information is for transmitting the image data in transmitting data format generated by a transmission program prepared by the server.

13. A non-transitory computer readable recording medium storing computer readable instructions for a terminal device that is provided with a communication interface, and a processor, wherein the instructions, when executed by the processor, causing the terminal device to perform:
input screen providing processing of providing an input screen for allowing a user to input format information defining a format of an HTTP request, wherein the input screen includes a plurality of fields, the plurality of fields including a first field for inputting item name of additional information to be included in a header of the HTTP request and a second field for inputting a value of the additional information to be included in the header of the HTTP request, the value corresponding to the item name of the additional information, the HTTP request containing a scanned data generated by an image reading apparatus and is:
transmitted to a first server that provides a first service to store the scanned data in the first server from the image reading apparatus when a first format information as the format information corresponding to the first service is inputted and transmitting to the image reading apparatus; and
transmitted to a second server that provides a second service to store the scanned data in the second server from the image reading apparatus when a second format information as the format information corresponding to the second service is inputted and transmitting to the image reading apparatus; and
transmitting processing of transmitting the format information input by the user through the input screen to the image reading apparatus through the communication interface.

14. The non-transitory computer readable recording medium according to claim 13,
wherein the instructions, when executed by the processor, causing the terminal device to further perform:
receiving processing of receiving the format information from the image reading apparatus; and
in the transmitting processing, transmitting the received format information to one or more other image reading apparatus.

* * * * *